(12) United States Patent
Montaron

(10) Patent No.: US 8,301,381 B2
(45) Date of Patent: Oct. 30, 2012

(54) METHOD FOR THE CHARACTERIZATION OF GEOLOGICAL FORMATIONS

(75) Inventor: Bernard Montaron, Clamart (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 639 days.

(21) Appl. No.: 11/721,879

(22) PCT Filed: Dec. 1, 2005

(86) PCT No.: PCT/EP2005/013006
§ 371 (c)(1),
(2), (4) Date: Jul. 23, 2009

(87) PCT Pub. No.: WO2006/063711
PCT Pub. Date: Jun. 22, 2006

(65) Prior Publication Data
US 2009/0292472 A1    Nov. 26, 2009

(30) Foreign Application Priority Data
Dec. 17, 2004  (EP) ................................. 04293036

(51) Int. Cl.
*G01V 9/00* (2006.01)
*G01V 3/14* (2006.01)
(52) U.S. Cl. ................... 702/7; 702/8; 702/12
(58) Field of Classification Search ............... 702/6–13; 324/324, 325, 332, 344; 250/254, 269.4
See application file for complete search history.

(56) References Cited

U.S. PATENT DOCUMENTS 4,786,873 A    11/1988 Sherman
2003/0105590 A1 *  6/2003 Mollison et al. ............... 702/7

OTHER PUBLICATIONS

Zhou, Dengen et al., A Percolation Study of Wettability Effect on the Electrical Properties of Reservoir Rocks, Transport in Porous Media 29: 85-98, 1997.
Tsakiroglou, Christos D. et al., Pore Network Analysis of Resistivity Index for Water-Wet Porous Media, Transport in Porous Media 35: 89-128, 1999.

* cited by examiner

*Primary Examiner* — Manuel L Barbee
(74) *Attorney, Agent, or Firm* — Stephanie Chi; Darla Fonseca; Jody DeStefanis

(57) ABSTRACT

A method for determining the water saturation of an underground formation traversed by a borehole, the method composing:
- determining a first parameter ($\mu$) that is representative of the critical exponent of the electrical conductivity of the formation:
- determining a second parameter (Wc or Sc or $\phi$c) that is representative of the formation percolation threshold;
- measuring a first set of formation properties; and
- combining, said first set of formation properties, first and second parameters in order to determine the water saturation (Sw) of said underground formation.

14 Claims, 3 Drawing Sheets

METHOD FOR THE CHARACTERIZATION OF GEOLOGICAL FORMATIONS

BACKGROUND

This invention relates to methods for the characterization of geological formation traversed by a borehole.

Resistivity measurements are at the origin of the logging services for the oil and gas exploration. One of the reasons which made these measurements so successful was the introduction of Archie's law, which allowed calculating the water saturation ($S_w$) of porous rock as a function of the measured resistivity ($R_t$). From there one calculates the hydrocarbon saturation (oil and/or gas), which is simply the complement to 1 for the water saturation, and this leads to the estimation of the total amount of oil in the reservoir by taking into account the measured porosity ($\phi$) and the estimated volume of the reservoir (V). This estimation is thus given by equation: $(1-S_w)\phi V$. These parameters are of highest interest when seeking for giving the best estimation of the formation hydrocarbons production capacity.

Archie's law, which can be expressed by the following equation: $R_t = R_w/S_w^n/\phi^m$, proved to be accurate in clean sandstone formations all around the world, and in general in most water-wet porous rocks, with both 'n' and 'm' exponent estimated to be at the value 2. This stability of the exponent values allowed to quickly make accurate evaluations of oil reserves for most sandstone reservoirs directly from porosity and resistivity logs. This technique was much less costly than the previously required extensive coring and core analysis campaigns, and was quickly adopted widely by the oil and gas industry as a standard petrophysical evaluation method.

With carbonate formations however, this turned out not to be satisfactory for most reservoirs. The values of the exponents 'n' and 'm' had to be adjusted using measurements on core samples, in order to fit resistivity measurements to the water saturation observed on cores. Typically the 'm' exponent remained close to 2 or slightly less than 2 (usually between 1.7 and 2), while the 'n' exponent could vary in a wide range of values from 2, or slightly less than 2, up to more than 5 (Values of 10 or more have been observed in laboratory experiments). This would have been fine if one could have established a correlation between the values of the exponents and the lithological nature of the rock layers, but no such general correlation could be established which meant that a given set of exponents validated for a given carbonate reservoir, or even a particular zone in the reservoir, could not be extrapolated to other reservoirs, or even to other zones within the same reservoir. The direct consequence of this lack of stability of the exponent values, is that one couldn't use the resistivity measurements from the logs taken in different wells drilled in the reservoir and apply one conversion law to calculate water saturations to estimate oil and gas reserves.

Furthermore, even in a given well the stability of the exponents is not guaranteed in advance in carbonate formations and it can be expected that 'n' will vary versus depth in the well.

Accurate oil reserve estimations in carbonates cannot be derived just from resistivity and porosity measurements but require either extensive coring and/or formation fluids sampling and/or independent log measurements of the water saturation. Unlike resistivity measurements which can be made quite deep into the formations (depth of investigation of several feet), the other known methods to measure water saturation are all shallow (a few inches) and therefore highly affected by mud invasion. This is why these direct measurements of water saturation cannot be considered representative of the true water saturation of the reservoir, which implies that extensive coring, and/or formation fluids sampling must be made in carbonates to make oil and gas reserve calculations. In fact, even the method based on coring and/or formation fluids sampling are questionable since cores properties are also affected by invasion, and fluid sampling does not provide a direct measurement of oil in place.

Many methods based on logging measurements other than coring and fluid sampling have been proposed to make better petrophysical evaluation of carbonates but all these methods rely on the classical formulation of Archie's law and are affected by the lack of stability of the 'n' exponent.

SUMMARY

It is the object of this invention to provide a petrophysical characterization method for underground formations that eliminates the drawbacks of existing methods and that allows accurate evaluations of oil and gas reserves.

To this end, the invention provides a method for determining the water saturation of an underground formation traversed by a borehole, the method comprising:
  determining the water saturation of an underground formation traversed by a borehole, the method comprising;
  determining a first parameter ($\mu$) that is representative of the critical exponent of the electrical conductivity of the formation;
  determining a second parameter (Wc or Sc or $\phi$c) that is representative of the formation percolation threshold;
  measuring a first set of formation properties; and
  combining said first set of formation properties, first and second parameters in order to determine the water saturation (Sw) of said underground formation.

Advantageously, the step of determining the first parameter comprises determining the formation lithofacies from lithologic measurements; and deducting from said formation lithofacies and corresponding tables for various types of rocks the value of said first parameter ($\mu$).

Advantageously, the step of determining the second parameter comprises measuring a second set of formation properties at a shallow depth in the vicinity of the borehole walls, said formation properties being chosen among a list comprising: shallow formation resistivity (Rxo), shallow formation water saturation (Sxo), formation porosity ($\phi$), mud filtrate resistivity (Rmf); calculating from said formation properties and said first parameter the value of said second parameter.

In an other embodiment, the steps of determining both first and second parameters comprise measuring at a first time ($t_1$) a first set of formation properties at a shallow depth in the vicinity of the borehole walls, said formation properties being chosen among a list comprising: shallow formation resistivity ($Rxo_1$), shallow formation water saturation ($Sxo_1$), formation porosity ($\phi$), mud filtrate resistivity ($Rmf_1$); measuring at a second time ($t_2$) a third set of formation properties at a shallow depth in the vicinity of the borehole walls, said formation properties being chosen among a list comprising: shallow formation resistivity ($Rxo_2$), shallow formation water saturation ($Sxo_2$), formation porosity ($\phi$), mud filtrate resistivity ($Rmf_2$); combining said second and third set of formation properties for said first and second times in order to determine said first and second parameters.

In a still interesting embodiment the steps of determining both first and second parameters comprise measuring at a depth (dph) along the axis of the borehole a first set of formation properties at a first shallow radial depth (drad1) in the vicinity of the borehole walls, said formation properties being chosen among a list comprising: shallow formation resistivity (R'xo$_1$), shallow formation water saturation (S'xo$_1$), formation porosity ($\phi$), mud filtrate resistivity (R'mf$_1$); measuring at the same depth (dph) along the axis of the borehole a third set of formation properties at a second shallow radial depth (drad2) in the vicinity of the borehole walls, said formation properties being chosen among a list comprising: shallow formation resistivity (R'xo$_2$), shallow formation water saturation (S'xo$_2$), formation porosity ($\phi$), mud filtrate resistivity (R'mf$_2$); combining said second and third sets of formation properties for said first and second radial shallow depths in order to determine said first and second parameters.

Advantageously, the first set of formation properties comprise formation resistivity (Rt), formation porosity ($\phi$), and the water formation resistivity (Rw) such that the water saturation (Sw) of the underground formation is calculated from the equation:

$$R_t = \frac{R_w}{(S_w\phi - W_c)^\mu}$$

In an other embodiment, the invention further comprises the step of verifying that first ($\mu$), second parameters (Wc or Sc or $\phi$c) and the first set of formation properties are determined in the same formation lithology from appropriate formation measurements including but not limited to formation dips or formation bed boundaries.

In another embodiment, the invention further comprises determining existence of formation fractures in the formation zone wherein the first set of formation properties is determined.

In those embodiment, the method of the invention advantageously further comprises when formation fractures are identified, the step of measuring the resistivity of the formation (R$_F$) in said formation fractures, the formation porosity ($\phi$), and the water formation resistivity (Rw) such that the water saturation (Sw) of the underground formation is calculated from the equation;

$$1/R_t = 1/R_f + (S_w\phi - W_c)^\mu/R_w$$

Advantageously, the underground formation is an oil-wet or mixed-wet formation, such as but not limited to carbonate formations, wherein formation pore inner surface is mostly or partially covered with non-conductive fluid such as hydrocarbons.

Interestingly, the first set of formation properties comprise formation resistivity (Rt), formation porosity ($\phi$), by and the water formation resistivity (Rw) such that the water saturation (Sw) of the underground formation is calculated from the equation:

$$R_t = \frac{R_w}{(S_w - S_c)^\mu \phi^\mu}$$

wherein Sc is the critical water saturation Sc.

In an other embodiment, the first set of formation properties comprise formation resistivity (Rt), formation porosity ($\phi$), and the water formation resistivity (Rw) such that the water saturation (Sw) of the underground formation is calculated from the equation:

$$R_t = \frac{R_w}{S_w^\mu (\phi - \phi_c)^\mu}$$

wherein $\phi$c is the critical porosity.

Advantageously, the tools used to make measurement are: at first and second time (t1, t2) a logging while drilling tool with measurements made at the same radial depth in the formation chosen from the list; resistivity, neutron sigma capture, dielectric constant, nuclear magnetic resonance (NMR)

Preferably, the tools used to make measurement are: at first time (t1) a logging while drilling tool with measurements made at the same radial depth in the formation chosen from the list; resistivity, neutron sigma capture, dielectric constant, nuclearmagnetic resonance (NMR), and at second time (t2) a wireline logging tool with measurements made at the same radial depth in the formation chosen from the list; resistivity, neutron sigma capture, dielectric constant, nuclear magnetic resonance (NMR).

DESCRIPTION OF THE DRAWINGS

The invention will now be described in relation to those accompanying drawings, in which.

DETAILED DESCRIPTION

Figure 1A:
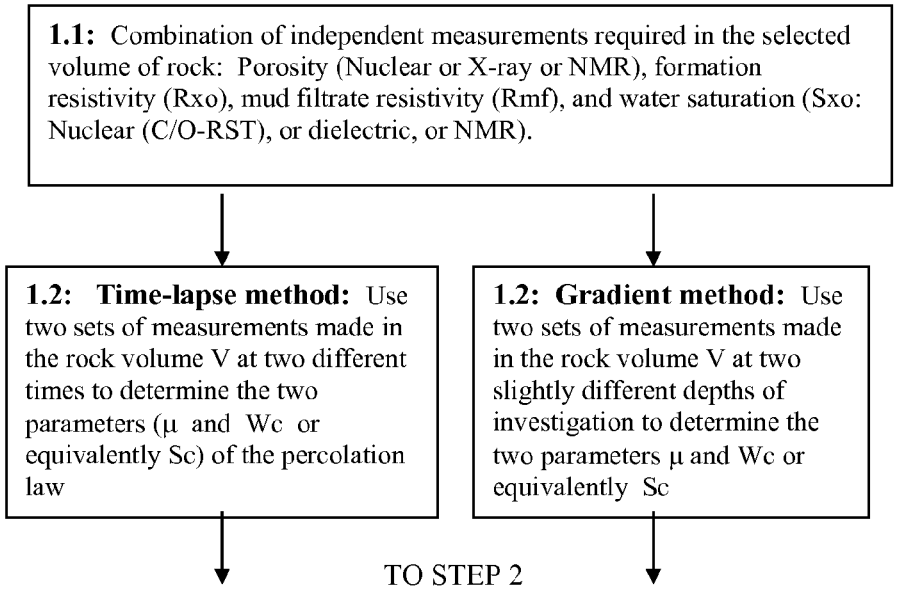
FIGS. 1A and 1B represent a schematic diagram of the method workflow according to the invention.

The reason for doing petrophysical measurements is to make accurate evaluation of hydrocarbon reserves, i.e. the total volume of oil and/or gas contained in a given reservoir. For simplicity we will refer here to oil. The total amount of oil in the reservoir is $$(1-S_w)\phi V$$

where V is the total volume of the reservoir, and where Sw and $\phi$ are the average wafer saturation and porosity taken over the entire reservoir. This evaluation is in fact usually done layer by layer i.e. by adding the oil volumes corresponding to various zones in the reservoir:

$$(1-S_{w1})\phi_1 V_1 + (1-S_{w2})\phi_2 V_2 + \ldots (1-S_{wn})\phi_n V_n$$

One key issue in this process is the so-called "upscaling" issue. Measurements of water saturation and porosity are necessarily local measurements, and the total volume of rock covered by these measurements is usually vary small compared to the volume of the entire reservoir. For example porosity measurements and direct water saturation measurements are typically made using nuclear measurements (Neutron sigma-capture cross section) and/or nuclear magnetic resonance (NMR) measurements which are leased to a depth of investigation of a few inches (10 to 15 cm) around the well. Direct water saturation measurements can also be made by measuring the dielectric constant of the rock which is very sensitive to the presence of water. Put this is also a very shallow measurement. This poses two questions: 1—Can these local measurements be considered representative of the average values across the reservoir? and 2—Is the quality of the measurements affected by the limited of depth of investigation?

Question 1 is generally answered by doing many measurements, first versus depth along the wells, and second in several wells drilled in the reservoir. The statistical variability observed can then be taken into account with proper correlation to a geological model of the reservoir.

Question 2 is not considered a serious problem for porosity which is a geometrical property of the rock which can be measured with good accuracy and corrected for environmental effects. However for water saturation clearly the existing direct measurements fall right into the range subject to invasion by the mud filtrate and what is measured is not the water saturation in the reservoir but what is called Sxo which is the water saturation in the transition zone around the well which has been changed, generally increased (when drilling with water based mud), by the invasion of well bore fluids. Sxo cannot therefore be used directly for oil reserves estimations.

One way to go around the problem is to use shallow measurements such as Sxo and the resistivity of the rock in the transition zone Rxo, to characterize the exponents of Archie's law, and then to use deeper resistivity measurements (depths of investigation of several feet can be achieved with laterolog tools) and from these to derive the water saturation in the reservoir using Archie's equation and assuming the exponent values are the same close to the well and a few feet away from the well. Unfortunately the accuracy of this approach is questionable because the 'n' exponent is known to vary with the water saturation, so even a few feet is enough to generate significant variations in the value of the 'n' exponent and Archie's law in the non invaded zone cannot be assumed in carbonates to be the same as Archie's law near the well bore. This problem is clearly created by the lack of stability of the 'n' exponent and it is the object of the present invention to solve that problem by using a different model.

It has thus been found that the below law of Archie should be significantly readapted, particularly in case reservoirs in carbonates formations are to be estimated.

Archie's Law:

$$R_t = \frac{R_w}{S_w^n \phi^m}$$

where Rt is the resistivity of the rock measured by a resistivity tool, Rw is the resistivity of the formation water, $\phi$ is the porosity of the rock matrix, and Sw is the water saturation of the porous volume of the rock matrix.

Advantageously, according to the invention, the following petrophysical equation will permit more accurate evaluation of the formation reservoirs:

$$R_t = \frac{R_w}{(S_w \phi - W_c)^\mu} \quad (1)$$

In this equation, Wc is a percolation threshold of the rock matrix and where $\mu$ is the "critical exponent". What makes this model unique is the choice of the percolation variable which is the product of the matrix porosity by the water saturation, i.e. the volume fraction of water in the rock referred to here as the "water volume fraction" for short and the percolation threshold Wc is the "critical water volume fraction".

This equation can take two other equivalent forms, for a given porosity $\phi$ one can define the "critical water saturation" Sc as $S_c = W_c/\phi$ and the equation becomes $$R_t = \frac{R_w}{(S_w - S_c)^\mu \phi^\mu} \quad (2)$$

Or for a given water saturation Sw one can define a "critical porosity" $\phi$c as $\phi_c = W_c/S_w$ and the equation takes the form $$R_t = \frac{R_w}{S_w^\mu (\phi - \phi_c)^\mu} \quad (3)$$

Forms (1) and (2) will be preferred over form (3) because in form (3) the critical porosity $\phi$c varies with the water saturation and the method in this invention is precisely avoiding parameters that vary with water saturation. In the rest of the invention we will use form (1) but all the process described is directly applicable with form (2), which is also covered by this invention. In all the workflow and method presented in FIG. 1, one can use Sc instead of Wc.

The advantage of this method compared to Archie's law, is that we replace the 'n' exponent which is known to vary with the water saturation, and also with the porosity, and the wettability, by a parameter (the critical water volume fraction Wc) which does not depend on Sw. Wc is equal to 0 for perfectly water-wet rock, and it is strictly positive end less than 1 for oil-wet rock or mixed-wet rock (partly water-wet and partly oil-wet). More precisely, the maximum value Wc can take for perfectly oil-wet rocks in practical conditions is less than 0.10 and generally in the range 0.04-0.08.

In this method both Wc and $\mu$ depend mostly on the geometry of the porous medium made of the network of pores and pore throats, and eventually vugs and fractures. Wc also depends on the nature of the fluids in the porous medium, and on the distribution of the wettability.

The method of the invention advantageously proposes the utilization of parameters that, because they do not depend on the saturation, can be assumed constant across a formation layer of uniform lithology. This property differentiates Wc from the 'n' exponent for which this is not the case.

The method of the invention requires the determination of the first parameter $\mu$ which the critical exponent of the electrical conductivity and is linked to the fractal dimension of the rock formation and of the second parameter Wc which is representative of the formation percolation threshold.

Measuring these two parameters such as Wc and $\mu$ requires at least two independent equations. If only one equation is available then one must assume a value for one of the two unknowns.

Figure 2:
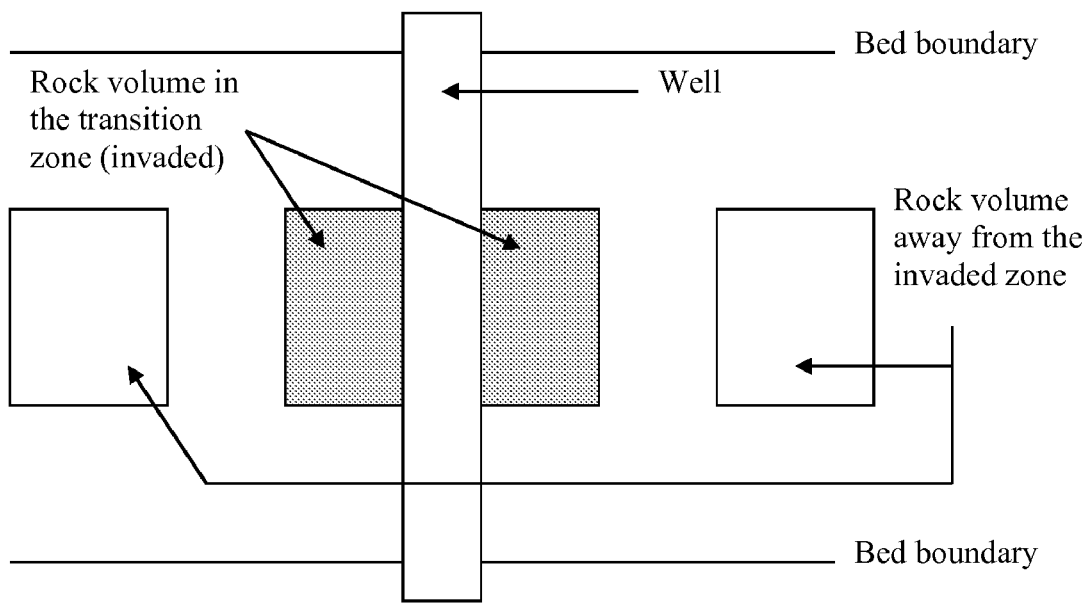
FIG. 2 is a schematic diagram of the borehole environment.

For these reasons, two determination steps are possible:

Firstly, in the case where limited information is available (only one equation) the best result will be obtained by assuming a value for the most stable parameter which is $\mu$. The critical exponent value for the rock matrix (non-fractured rock) is generally very close to 2, typically between 1.9 and 2.0. So the first method is to assume $\mu \approx 2$ (for example) and with a combination of tools to make four measurements (The volume of rock measured is at a shallow depth of investigation because of the limited penetration of nuclear/X-ray/NMR/dielectric measurements)—Rxo, Sxo, porosity ($\phi$) and Rmf which is the resistivity of the mud filtrate (see FIG. 2)—to derive the value of the critical water volume fraction Wc using the equation $$W_c = S_{xo}\phi - \left(\frac{R_{mf}}{R_{xo}}\right)^{1/\mu}$$

where Rxo is the resistivity of the formation at a shallow radial depth compared to the borehole walls, and Sxo is the formation water saturation at said shallow depth. Therefore, both Rxo end Sxo are "contaminated" by the mud that has been used when the borehole has been drilled as it is known by any skilled man in the art.

This method will give acceptable results for relatively high values of the critical water volume fraction, i.e. above 0.035, or of course if the value used for $\mu$ is known to be fairly accurate.

In this method, the value assumed for $\mu$ can be derived from the correlation that exists between the critical exponent and the rock lithofacies, i.e. the type of rock. Indeed $\mu$ is known to be directly a function of the geometrical structure of the pores network of the rock and of the nature of the fluids it contains. Such correlation can be established once and for all and stored in a "catalog" of rock types. Rock types can be recognized from suitable log measurements (e.g. litholog, lithotool kit applications as performed by applicant's tools) and the corresponding value of $\mu$ inferred.

Figure 1B:
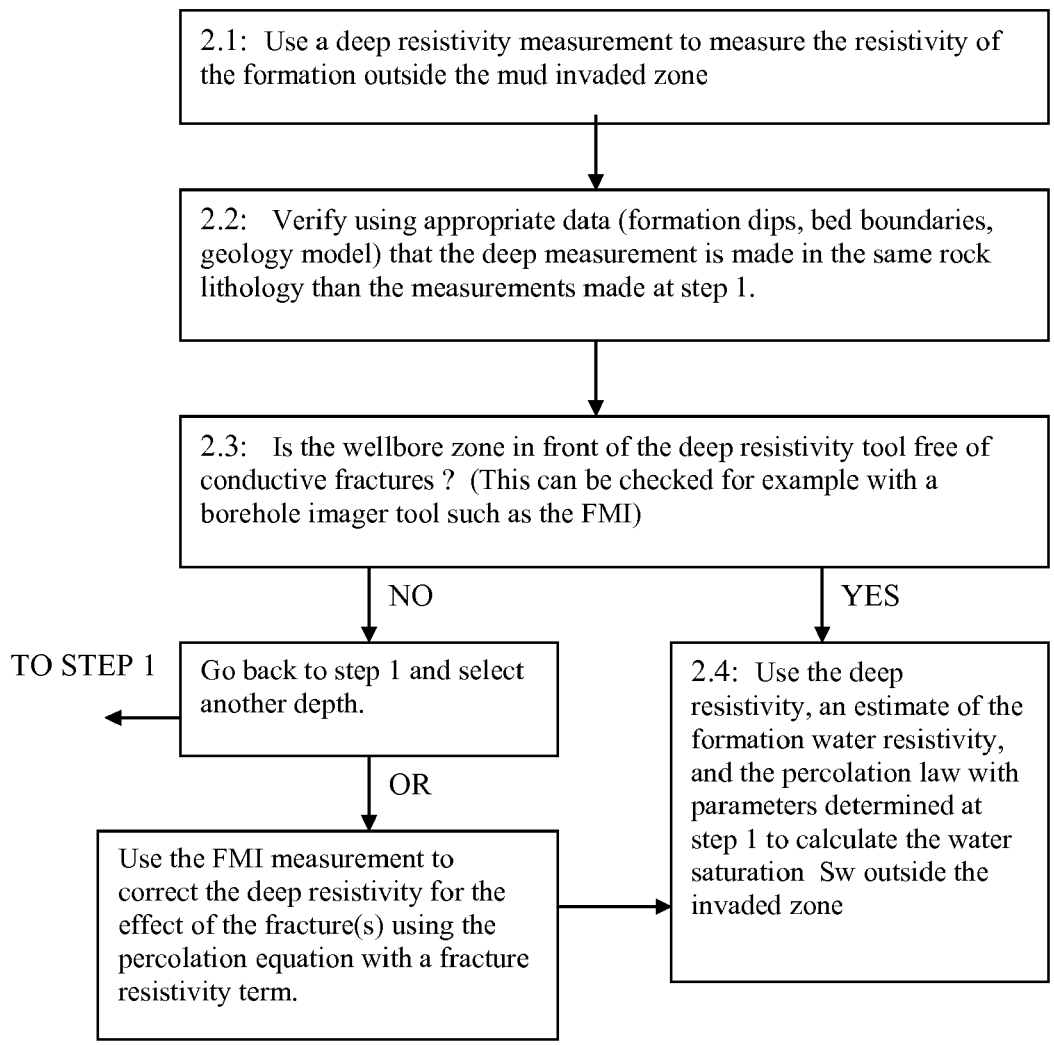

Note, as seen on diagram of FIG. 1, that one must check that the volume of rock observed with the resistivity tool (Rxo) does not contain electrically conductive fractures, or if it does that the effect of fractures is accounted for. This can be checked with an electrical borehole imager tool. The presence of a conductive fracture within the volume of investigation of the resistivity tool will affect the measurement of Rxo which would then not be representative of the matrix Rxo.

Another determination step for parameters of the invention can be in the case where two independent equations are available for the same volume of rock matrix (non-fractured rock) with two different values of the saturation, one can directly calculate the values of Wc and $\mu$ by solving for these two unknowns the set of two equations $$(S_{xo1}\phi - W_c)^\mu = \frac{R_{mf1}}{R_{xo1}}, \quad (S_{xo2}\phi - W_c)^\mu = \frac{R_{mf2}}{R_{xo2}}$$

Example situations where two saturation and resistivity values are available for the same volume of rock are
  When measurements are made with the same tools at different times and average saturation values within the rock volume observed are different due to the progression of mod filtrate invasion versus time (e.g. Logging While Drilling time-lapse measurements)
  When combining LWD measurements and Wireline measurements. LWD measurements made while drilling can be for example: 1—The water saturation at a shallow depth of investigation from nuclear (sigma from fast neutron) or dielectric (dielectric constant measured with a high frequency tool) and 2—the shallow resistivity with a laterolog type tool or a 2 Mhz resistivity tool. Wireline measurements are made at a later time after invasion had progressed deeper in the formation and changed the wafer saturation in the same volume of rock characterized with the LWD measurements. One can then make the same measurements, like for example 1—water saturation (Sxo) from nuclear (sigma) or dielectric methods, and 2—shallow resistivity from Rxo or short spacing laterolog (which ever matches the best the depth of investigation of the LWD measurements).
  When a first measurement is made, and then a known conductive fluid with a resistivity different from Rmf is forced into the formation at the same point, for example using a special tool containing a pump and a fluid reservoir, and a second measurement is made (This would require a specific injection tool with integrated Sxo and Rxo measurements).

There are also cases where two saturation values are available for almost the same volume of rock, for example when making measurements at two slightly different depths of investigation taking advantage of the non-uniform distribution of Sxo and Rxo in the transition zone.

The advantage of the first two methods above (time-lapse LWD and LWD+Wireline logging) is that these allow sufficient time (several hours) between the two measurements. This is important because it is known from laboratory experiments that resistivity measurements in a rock for which water saturation was altered take a fairly long time to stabilize, up to 24 hours or more. Time-lapse LWD measurements can therefore be made at each bit run which would typically exceed 24 hours.

Again here one must check that there is no fracture in the volume of rock investigated by the resistivity measurement. For situations where this is not possible, like the case of formations highly fractured, a second embodiment of the method of the invention will be described hereinafter.

Note that the critical water volume fraction can be computed quickly using the iteration $$W_c(n+1) = S_{xo2}\phi - \frac{(S_{xo1}-S_{xo2})\phi}{(S_{xo2}\phi - W_c(n))^E - 1}$$

where $$E = \frac{\ln(R_{mf1}/R_{xo1})}{\ln(R_{mf2}/R_{xo2})} - 1$$

Starting with $W_c(0)=0$ only 5 iterations are generally sufficient to obtain an accurate value for the solution and the value of $\mu$ can then be easily computed from one of the initial equations.

Of course, these are no limitation measurement possibilities for logging or logging-while-drilling tools. It will be appreciated that any technique known by the man skilled in the art can be used to perform formation measurements requested by the method of the invention in still another example of the method according to the invention, formation measurement used to determined both first parameter $\mu$ and second parameter Wc could be performed on formation cuttings issued from the borehole being drilled and said parameters could than be reused to calculation formation resistivity Rt a radial depth compared to the borehole walls that have not been invaded by drilling mud.

Finally, one could also use known values for both first parameter $\mu$ and second parameter Wc (or Sc or $\phi$c), those values would have been acquired from correlation between tables and the lithology of the formation to be estimated. From the physics theory of fractal media and percolation theory, it has been shown that the critical water volume fraction Wc and the critical exponent $\mu$ are independent of Sw, and are correlated to the geometry of the network of pores and pore throats and vugs in the rock matrix. Wc also depends on the wettability angle between oil and water in the formation which can be assumed fairly constant, and as a result both Wc and $\mu$ can be expected to correlate very well with "lithology facies" (rock types). As previously explained, in all equations and determination of the present invention, second parameter can either be Wc, Sc or φc.

A table can thus be made of a list of rock types (non-fractured) and their corresponding fully oil-wet critical water volume fraction Wc and μ values. This table can be derived from cores and can be established once and for all. The variability of Wc and μ for non-fractured carbonate rock types is expected to be fairly limited. Wc is expected to take values close to 0.05 and μ to take values close to 2 for most non-fractured rocks including vuggy carbonates.

As it can be seen on the schematic workflow of FIG. 1, in the first step described in the previous section the parameters Wc and μ have been determined from shallow measurements using a combination of tools such as Density/Neutron, Rxo and/or Dielectric constant, and following one of the steps described above.

Then, in the method of the invention, the values Wc and μ have to be applied to a zone located deeper in the reservoir corresponding to the depth of investigation of a deep laterolog tool or an equivalent tool (Wireline or LWD) which will provide a value of the formation resistivity Rt away from the invaded zone. Assuming the resistivity Rw of the formation water is known, one can calculate the water saturation in the reservoir using $$S_w = \frac{1}{\phi}\left(W_c + \left(\frac{R_w}{R_t}\right)^{1/\mu}\right)$$

When using the classical Archie's law, significant errors can be made by assuming that the 'n' exponent has the same value several feet away from the well and near the well bore. Errors can have positive or negative signs depending on the wettability of the formations and the change in water saturation between the invaded zone and the virgin zone. For highly oil-wet formations and with a big contrast of water saturations between the two zones the water saturation determined based on Archie's law will generally be significantly lower then the actual value. For example with Wc=0.04, μ=2, Rmf=0.025 ohm-m, Rw=0.015 ohm-m, Sxo=0.60 and true Sw=0.25 the error made on Sw using Archie's law is −15% which corresponds to a large over-estimation of oil in place reserves. Errors with positive sign, corresponding to an under-estimation of oil in place reserves using Archie's law will generally not exceed 3%. For example with Wc=0.03, μ=2, Rmf=0.025 ohm-m,
Rw=0.015 ohm-m, Sxo=0.80 and true Sw=0.40 the error made on Sw using Archie's law is +3%.

Thanks to the stability of Wc and μ, the method described above avoids this problem and offers a much more accurate determination of the true water saturation, and therefore a more accurate evaluation of the oil in place in the reservoir.

Archie's law parameters can be linked to the percolation equation parameters by writing $$S_w^n \phi^m = (S_w \phi - W_c)^\mu$$

Taking m=μ, Archie's 'n' exponent can be directly expressed as $$n = \mu \frac{\ln(S_w - S_c)}{\ln S_w}$$

where, as seen before, $S_c = W_c/\phi$. The equation above shows how 'n' varies with the water saturation and other parameters.

Within a limited range of water saturation values, this equation provides a value of 'n' which is almost constant, i.e. almost independent of Sw within this limited interval. This explains why Archie's law has been used and why 'n' and 'm' exponents could be characterised experimentally.

The methods described in the present invention could therefore be applied to 'n' and 'm' by using the equation above that relates Archie's law parameters to the percolation parameters.

As it as been already said above, in case of fractures in the formation, too method of the invention comprises further steps (as seen on FIG. 1):

Carbonate reservoirs are often drilled using salty muds with high electrical conductivity. This is why the presence of fractures invaded with mud can have a significant effect on resistivity measurements, especially when the contrast between the low resistivity of the fracture and the high resistivity of the oil rich carbonate mates is large.

It can be shown that in presence of conductive fractures the method of the invention can be modified to take this effect into account and the equation becomes $$1/R_t = kS_{wF}\phi_F/R_m + (S_w\phi - W_K)^\mu/R_w$$

where $S_{wF}$ is the water saturation in the fractures, $\phi_\mu$ is the porosity of the fractures,
$R_m$ is the resistivity of the mud, and k is a geometrical factor,
k varies depending on the orientation of the tool with respect to the fractures, for example in the two extreme cases of the well axis (i.e. tool axis) parallel—which is generally the case for vertical wells—and perpendicular to the fractures (typical of horizontal wells) one has
Vertical Wells:

$$k = \frac{1}{2\pi}\ln\left(\frac{L}{r_w}\right)$$

Horizontal Wells: k=L/h
where L is the radius of investigation of the resistivity tool, h its vertical resolution and $r_w$ is the radius of the well. Typical values for k are in the range of 0.3 to 0.5 in vertical wells and 10 times larger in horizontal wells. This effect is one of the main reason why the 'm' exponent of Archie's law is often found significantly reduced in fractured rocks.

In the method relative to the invention, we take advantage of the stability of the percolation and fractal parameters and use the equation below $$1/R_t = 1/R_F + (S_w\phi - W_c)^\mu/R_w$$

where the fracture resistivity term $R_F$ is measured using an adequate independent measurement such as a calibrated wellbore imager tool, and this value is used to correct the shallow measurements (Rxo) and the deep resistivity measurements (laterolog) according to appropriate correction algorithms defined from the modeling of the tools responses to fractures. One can also use the information from a wellbore imager tool or any other appropriate tool, which can detect the presence of fractures, to select intervals in the well which are fracture-free in order to make accurate water saturation determination in these intervals using the percolation equation.

The invention claimed is:
1. A method for determining the water saturation of an underground formation traversed by a borehole using a formation system, the method comprising:
operating one or more tools of the formation system in a borehole to measure a first set of formation properties among the list of formation resistivity ($R_t$), formation porosity ($\phi$), water formation resistivity ($R_w$);

using the formation system to determine a first parameter ($\mu$) that is representative of a critical exponent of an electrical conductivity of the formation;

using the formation system to determine a second parameter ($W_c$ or $S_c$ or $\phi_c$) that is representative of a formation percolation threshold; and using one or more processors in the formation system to combine the first set of formation properties, the first parameter, and the second parameter in order to determine the water saturation ($S_W$) of the underground formation.

2. A method as claimed in claim 1, wherein using the formation system to determine the first parameter comprises:
a. using one of the one or more tools to measure lithologic measurements from the formation;
b. using one of the one or more processors to determine formation lithofaces based on the lithologic measurements; and
c. using one of the one or more processors to deduct from the formation lithofacies and corresponding tables for various types of rocks the value of the first parameter ($\mu$).

3. A method as claimed in claim 2, wherein using the formation system to determine the second parameter comprises:
a. using one of the one or more tools to measure a second set of formation properties at a shallow depth in the vicinity of the borehole walls, the second set of formation properties being chosen among a list comprising: shallow formation resistivity (Rxo), shallow formation water saturation (Sxo), formation porosity ($\phi$), mud filtrate resistivity (Rmf); and
b. using one of the one or more processors to calculate from the second set of formation properties and the first parameter the value of the second parameter.

4. A method as claimed in claim 1, wherein using the formation system to determine both first and second parameters comprise:
using one of the one or more tools to measure at a first time ($t_1$) a second set of formation properties at a shallow depth in the vicinity of the borehole walls, said formation properties being chosen among a list comprising: shallow formation resistivity ($Rxo_1$), shallow formation water saturation ($Sxo_1$), formation porosity ($\phi$), mud filtrate resistivity ($Rmf_1$);
using one of the one or more tools to measure at a second time ($t_2$) a third set of formation properties at a shallow depth in the vicinity of the borehole walls, said formation properties being chosen among a list comprising: shallow formation resistivity ($Rxo_2$), shallow formation water saturation ($Sxo_2$), formation porosity ($\phi$), mud filtrate resistivity ($Rmf_2$); and
using one of the one or more processors to combine the second and third sets of formation properties for the first and second times in order to determine the first and second parameters.

5. A method as claimed in claim 4, wherein the one or more tools used to determine formation properties include a logging while drilling tool with measurements chosen from the list: resistivity, neutron sigma capture, dielectric constant, nuclear magnetic resonance (NMR), wherein measurements at the first time (t1) are made at a first radial depth in the formation and measurements at the second time (t2) are made at a second radial depth in the formation, and the first radial depth and the second radial depth are the same.

6. A method as claimed in claim 4, wherein the one or more tools to determine formation properties are: at first time (t1) a logging while drilling tool with measurements chosen from the list: resistivity, neutron sigma capture, dielectric constant, nuclear magnetic resonance (NMR), and at second time (t2) a wireline logging tool with measurements chosen from the list: resistivity, neutron sigma capture, dielectric constant, nuclear magnetic resonance (NMR), wherein measurements at the first time (t1) are made at a first radial depth in the formation and measurements at the second time (t2) are made at a second radial depth in the formation, and the first radial depth and the second radial depth are the same.

7. A method as claimed in claim 1, wherein using the formation system to determine both first and second parameters comprise:
using one of the one or more tools to measure at a depth (dph) along the axis of the borehole a second set of formation properties at a first shallow radial depth (drad1) in the vicinity of the borehole walls, said formation properties being chosen among a list comprising: shallow formation resistivity ($R'xo_1$), shallow formation water saturation ($S'xo_1$), formation porosity ($\phi$), mud filtrate resistivity ($R'mf_1$);
using one of the one or more tools to measure at the same depth (dph) along the axis of the borehole a third set of formation properties at a second shallow radial depth (drad2) in the vicinity of the borehole walls, said formation properties being chosen among a list comprising: shallow formation resistivity ($R'xo_2$), shallow formation water saturation ($S'xo_2$), formation porosity ($\phi$), mud filtrate resistivity ($R'mf_2$); and
using one of the one or more processors to combine the second and third sets of formation properties for the first and second radial shallow depths in order to determine the first and second parameters.

8. A method as claimed in claim 1, wherein using one or more processors in the formation system to determine the water saturation ($S_w$) of the underground formation is calculated from the equation:

$$R_t = \frac{R_w}{(S_w\phi - W_c)^\mu}.$$

9. A method as claimed in claim 8, further comprising using one or more tools to measure the resistivity of the formation ($R_F$) in said formation fractures, the formation porosity ($\phi$), and the water formation resistivity ($R_w$) such that the water saturation ($S_w$) of the underground formation is calculated from the equation:

$$1/R_t = 1/R_F + (S_w\phi - W_c)^\mu / R_w.$$

10. A method as claimed in claim 1, further comprising the step of using one of the one or more processors to verify that the first parameter ($\mu$), the second parameter ($W_c$ or $S_c$ or $\phi_c$) and the first set of formation properties are determined in the same formation lithology from appropriate formation measurements including formation dips or formation bed boundaries.

11. A method as claimed in claim 1, further comprising using the formation system to determine the existence of formation fractures in a formation zone wherein the first set of formation properties is determined.

12. A method as claimed in claim 1, wherein the underground formation is an oil-wet or mixed-wet formation including carbonate formations, wherein formation pore inner surface is mostly or partially covered with non-conductive fluid including hydrocarbons.

13. A method as claimed in claim 1, wherein using one or more processors to calculate the water saturation ($S_w$) of the underground formation comprises using the equation:

$$R_t = \frac{R_w}{(S_w - S_c)^\mu \phi^\mu}$$

wherein $S_c$ is the critical water saturation.

14. A method as claimed in claim 1, wherein using one or more processors to calculate the water saturation ($S_w$) of the underground formation comprises using the equation:

$$R_t = \frac{R_w}{S_w^\mu (\phi - \phi_c)^\mu}$$

wherein $\phi_c$ is the critical porosity.

* * * * *